(12) United States Patent
Payne et al.

(10) Patent No.: US 6,845,874 B2
(45) Date of Patent: Jan. 25, 2005

(54) COLLISION ATTENUATING SYSTEM

(76) Inventors: Thomas S. Payne, 32205 Allison Dr., Union City, CA (US) 94587; James M. Payne, 3721 Knox Ave., Rosamond, CA (US) 93560

(*) Notice: Subject to any disclaimer, the term of this patent is extended or adjusted under 35 U.S.C. 154(b) by 0 days.

(21) Appl. No.: 10/461,229

(22) Filed: Jun. 13, 2003

(65) Prior Publication Data

US 2004/0020888 A1 Feb. 5, 2004

Related U.S. Application Data

(63) Continuation-in-part of application No. 10/261,923, filed on Oct. 1, 2002, now Pat. No. 6,619,491, which is a division of application No. 09/753,540, filed on Jan. 2, 2001, now Pat. No. 6,474,489, which is a continuation-in-part of application No. 09/267,028, filed on Mar. 12, 1999, now abandoned.

(51) Int. Cl.[7] .............................................. B61G 11/00
(52) U.S. Cl. .................. 213/221; 213/223; 105/392.5; 105/394
(58) Field of Search ................................ 213/220, 221, 213/223; 293/24, 25, 26, 107, 118, 119, 131, 132, 134, 42; 105/394, 392.5

(56) References Cited

U.S. PATENT DOCUMENTS

| | | |
|---|---|---|
| 520,573 A | 5/1894 | Richards |
| 533,418 A | 1/1895 | Richards |
| 616,395 A | 12/1898 | Bedford |
| 625,603 A | 5/1899 | Prophitt |
| 626,480 A | 6/1899 | Bemelmans |
| 761,421 A | 5/1904 | Snyder |
| 854,290 A | 5/1907 | Hale |
| 1,378,423 A * | 5/1921 | Robinson ..................... 293/42 |
| 2,090,988 A | 8/1937 | Snyder |
| 3,346,292 A * | 10/1967 | Lundman ....................... 293/9 |
| 3,677,595 A | 7/1972 | Hamilton |
| 3,843,181 A | 10/1974 | Dera et al. |
| 3,905,629 A * | 9/1975 | Kwong ......................... 293/24 |
| 3,934,912 A | 1/1976 | Ogihara et al. |
| 4,715,292 A | 12/1987 | Pavlick et al. |
| 5,042,858 A * | 8/1991 | Schubert et al. .............. 293/24 |
| 5,052,732 A | 10/1991 | Oplet et al. |
| 5,101,927 A | 4/1992 | Murtuza |
| 5,199,755 A | 4/1993 | Gertz |
| 5,213,383 A | 5/1993 | Muselli et al. |
| 5,619,931 A | 4/1997 | Madison |
| 5,697,657 A | 12/1997 | Unrath, Sr. |
| 5,725,265 A | 3/1998 | Baber |
| 5,785,368 A * | 7/1998 | Hartmann et al. .......... 293/134 |
| 5,810,427 A | 9/1998 | Hartmann et al. |
| 6,039,349 A | 3/2000 | Laporte et al. |
| 6,056,336 A | 5/2000 | Balgobin |
| 6,106,038 A | 8/2000 | Dreher |
| 6,293,205 B1 | 9/2001 | Butler |

\* cited by examiner

*Primary Examiner*—Mark T. Le
(74) *Attorney, Agent, or Firm*—Dorsey & Whitney LLP

(57) ABSTRACT

A collision attenuator for a vehicle including an energy absorbing cylinder, a mounting assembly adapted to secure the energy absorbing cylinder to an end of the vehicle, a contact plate mounted to the energy absorbing cylinder, a control valve for extending and retracting the energy absorbing cylinder in order to move the contact plate with respect to the end of the vehicle. A comparator is operably coupled with the control valve, wherein the comparator is configured to adjust the energy absorbing cylinder based upon a speed signal indicative of the speed of the moving vehicle. A coupler detector is operably coupled with the control valve, wherein the coupler detector inhibits the extension of the energy absorbing cylinder unless the coupler detector determines that the coupler is open. A pivot assembly pivotally secures the contact plate to the energy absorbing cylinder allowing the contact plate to pivot laterally about an upright axis with respect to the energy absorbing cylinder. A quick-release mechanism detachably secures the energy absorbing assembly to the end of the vehicle. A vehicle support portion extends horizontally forward adjacent a bottom edge of the contact plate.

22 Claims, 11 Drawing Sheets

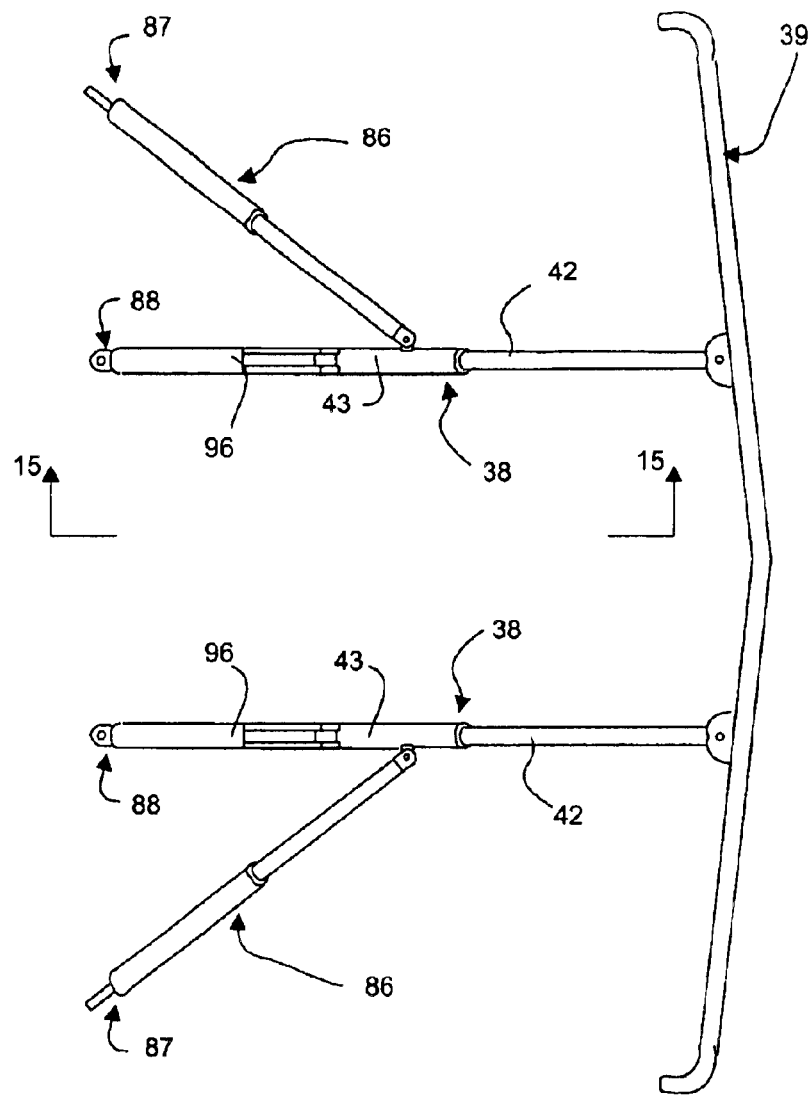
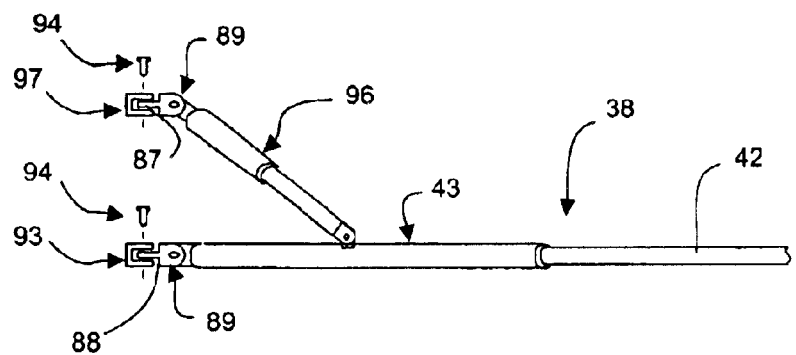
FIG. 15

COLLISION ATTENUATING SYSTEM

CROSS-REFERENCES TO RELATED APPLICATIONS

This application is a Continuation-in-part of U.S. patent application Ser. No. 10/261,923, filed Oct. 1, 2002, entitled COLLISION ATTENUATOR ASSEMBLY, now U.S. Pat. No. 6,619,491, which is a Divisional of U.S. patent application Ser. No. 09/753,540 filed Jan. 2, 2001, entitled COLLISION ATTENUATOR ASSEMBLY and now U.S. Pat. No. 6,474,489, which is a Continuation-in-part of U.S. Pat. No. 09/267,028, filed Mar. 12, 1999, entitled COLLISION ATTENUATOR ASSEMBLY and now abandoned, the entire contents of which applications is incorporated herein by this reference.

BACKGROUND OF THE INVENTION

1. Field of the Invention

The present invention relates, in general, to collision attenuators and, more particularly, to improved collision attenuators for the front ends of railroad trains or other moving vehicles and to methods for their use.

2. Description of Related Art

Railroad trains are heavy vehicles that are difficult to stop in emergency situations. Furthermore, railroad trains cannot be steered to avoid pedestrians and other motor vehicles that inadvertently cross the path of a moving railroad train. Railroad trains are extremely heavy relative to pedestrians as well as most motor vehicles including automobiles, sport-utility vehicles, trucks, vans, and buses. The front of a locomotive or a railroad car is typically constructed of a large rigid steel structure that yields minimally, if at all, in the event of a collision with a pedestrian or a motor vehicle. Unfortunately, due to these factors, collisions between railroad trains and pedestrians or between railroad trains and motor vehicles result all too often in fatalities for the pedestrians or for the occupants of the impacted motor vehicles.

Current efforts to reduce these fatalities have focused on collision prevention. Collision prevention techniques include warning devices on the railroad train such as horns and lights, warnings and barriers at railway and pedestrian crossings and at railway and motor vehicle crossings. Also, fencing is used along railroad right of ways to restrict access by pedestrians and/or motor vehicles. Unfortunately, pedestrians and motor vehicle operators on occasion accidentally miss, ignore, or deliberately circumvent these warning systems.

One known system for reducing the severity of impact between a train and a land vehicle is disclosed U.S. Pat. No. 6,293,205 to Butler. The Butler patent discloses a train collision system in the form of a flatbed car coupled to the front of a train. Disadvantageously, such systems are large and relatively expensive in that an additional rail car is required. Such systems are difficult to store and would occupy space that could be used by other working rail cars and locomotives. Such systems may also be very expensive to maintain, replace or recondition, possibly approaching or exceeding the cost of a rail car. Furthermore, such systems cannot be deactivated in order to prevent damage thereto in the event of slow speed and/or otherwise minor impacts.

What is needed is an improved collision attenuating system that overcomes the above and other disadvantages of known collision attenuating devices and collision prevention techniques.

Additionally, when a relatively large moving vehicle, such as a sport-utility vehicle, truck, or bus, impacts a smaller vehicle the difference in mass of the two vehicles results in an inordinate amount of damage and injury to the occupants of the smaller impacted vehicle.

What is also needed is an improved collision attenuating system which can be utilized on larger moving vehicles while overcoming the above and other disadvantages of known collision attenuating devices and collision prevention techniques.

BRIEF SUMMARY OF THE INVENTION

In summary, one aspect of the present invention is directed to a collision attenuating system for a vehicle including an energy absorbing cylinder, a mounting assembly adapted to secure the energy absorbing cylinder to an end of the vehicle, a contact plate mounted to the energy absorbing cylinder, a control valve for extending and retracting the energy absorbing cylinder in order to move the contact plate with respect to the end of the vehicle, and a comparator operably coupled with the control valve, wherein the comparator is configured to adjust the energy absorbing cylinder based upon a speed signal indicative of the speed of the moving vehicle. The collision attenuating system may include a minimum speed detector, wherein the comparator inhibits the extension of the energy absorbing cylinder until the vehicle reaches a minimum threshold speed. The energy absorbing cylinder may be either a double acting hydraulic cylinder or a double acting pneumatic cylinder. The mounting assembly may include a quick-release mechanism for detachably securing the energy absorbing assembly to the end of the vehicle.

Another aspect of the present invention is directed to a collision attenuating system for a vehicle having a coupler including an energy absorbing cylinder, a mounting assembly adapted to secure the energy absorbing cylinder to an end of the vehicle, a contact plate mounted to the energy absorbing cylinder, a control valve for extending and retracting the energy absorbing cylinder in order to move the contact plate with respect to the end of the vehicle, and a coupler detector operably coupled with the control valve, wherein the coupler detector inhibits the extension of the energy absorbing cylinder unless the coupler detector determines that the coupler is open. The collision attenuating system may include a comparator operably coupled with the control valve, wherein the comparator is configured to adjust the energy absorbing cylinder based upon a speed signal indicative of the speed of the moving vehicle.

A further aspect of the present invention is directed to a collision attenuating system for a vehicle including an energy absorbing cylinder, a mounting assembly adapted to secure the energy absorbing cylinder to an end of the vehicle, a contact plate mounted to the energy absorbing cylinder, and a pivot assembly pivotally securing the contact plate to the energy absorbing cylinder allowing the contact plate to pivot laterally about an upright axis with respect to the energy absorbing cylinder. The collision attenuating system may include a diagonally oriented lateral energy absorbing unit configured to interconnect a portion of the energy absorbing cylinder to the vehicle. The contact plate may pivot with respect to the energy absorbing cylinder about a vertical axis. The mounting assembly may include a quick-release mechanism for detachably securing the energy absorbing assembly to the end of the vehicle.

Still another aspect of the present invention is directed to a collision attenuating system for a vehicle including an energy absorbing cylinder, a mounting assembly adapted to secure the energy absorbing cylinder to an end of the vehicle, a contact plate mounted to the energy absorbing cylinder, a control valve for extending and retracting the energy absorbing cylinder in order to move the contact plate with respect to the end of the vehicle, and a quick-release mechanism for detachably securing the energy absorbing assembly to the end of the vehicle. The contact plate may include a laterally expandable section. The laterally expandable section may include an obtuse angled portion that is configured to at least partially flatten upon impact. The collision attenuating system may include a plurality of energy absorbing cylinders, the contact plate mounted to an outer end of each one of the energy absorbing cylinders. The collision attenuating system may include a plurality of mounting assemblies adapted to secure the plurality of energy absorbing cylinders to the end of the vehicle, wherein at least of the one mounting assemblies includes a horizontal pivot allowing the one mounting assembly and a corresponding energy absorbing cylinder to pivot with respect to the end of the vehicle.

Yet another aspect of the present invention is directed to a collision attenuating system for a vehicle including an energy absorbing cylinder, a mounting assembly adapted to secure the energy absorbing cylinder to an end of the vehicle, a contact plate mounted to the energy absorbing cylinder, a control valve for extending and retracting the energy absorbing cylinder in order to move the contact plate with respect to the end of the vehicle, and a vehicle support portion extending horizontally forward adjacent a bottom edge of the contact plate. The vehicle support portion may extend along and forward from the bottom edge of the contact plate. The collision attenuating system may include a comparator operably coupled with the control valve, wherein the comparator is configured to adjust the energy absorbing cylinder based upon a speed signal indicative of the speed of the moving vehicle. The collision attenuating system may include a pivot assembly pivotally securing the contact plate to the energy absorbing cylinder allowing the contact plate to pivot laterally about an upright axis with respect to the energy absorbing cylinder.

An object of the present invention is to provide an improved collision attenuating system to better reduce the severity of an impact, which cannot be otherwise prevented, between a moving train or other relatively large vehicle and either a pedestrian or another relatively small vehicle.

The collision attenuating system of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 14 is a detailed plan view of the collision attenuating system of FIG. 12 removed from the front end of the locomotive, the collision attenuating system shown equipped with lateral energy absorbing units.

FIG. 15 is a cross-sectional view of the collision attenuating system and lateral energy absorbing units of FIG. 14 taken along line 15—15 of FIG. 14.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
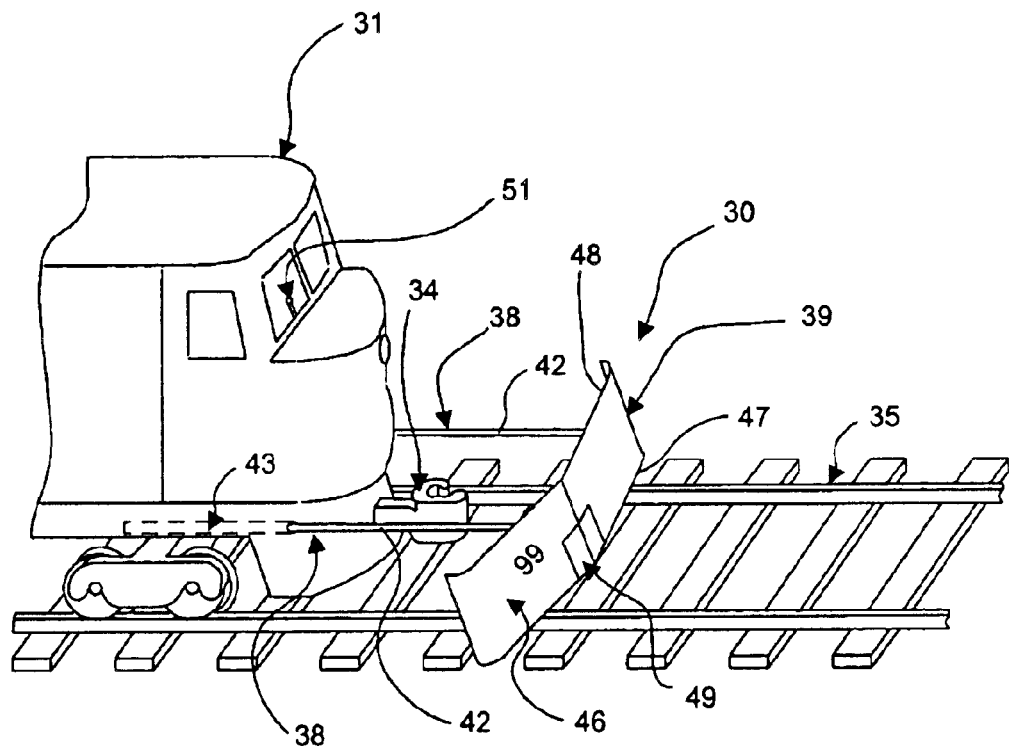
FIG. 1 is a perspective view of a collision attenuating system mounted on the front end of a locomotive in accordance with the present invention, the attenuating system shown in an extended, deployed mode.

Turning now to the drawings, wherein like components are designated by like reference numerals throughout the various figures, attention is directed to FIG. 1, which shows a collision attenuator 30 mounted on the front end of a locomotive 31, which locomotive is equipped with a coupler 34 and is configured for motion along a railway 35. It will be understood that the collision attenuator can also be configured to be mounted on other types of rail cars including, but not limited to, flatbeds, boxcars, and light rail vehicles. Alternatively, collision attenuator 30 can be attached to the front of any relatively large and fast moving vehicle such as a truck, a bus, a car, or a sport-utility vehicle. For the purpose of the present invention, it will be understood that the term "coupler" refers to any device or assembly intended to connect two cars, trailers, locomotives, or moving vehicles together and includes, but is not limited to, trailer hitches.

Collision attenuator 30 generally includes a pair of shock absorbing assemblies 38 and a contact plate 39 secured to the forward ends of the shock absorbing assemblies. In this respect, collision attenuator 30 is similar in some aspects to those which are disclosed by U.S. Pat. No. 6,474,489, the entire content of which patent is incorporated herein by this reference. Collision attenuator 30 also includes a control system for moving contact plate 39 between deployed and retracted positions, as is discussed in greater detail below.

In the illustrated embodiment, each shock absorbing assembly 38 is a double acting cylinder having a piston rod 42 that telescopically extends from a cylindrical housing 43. In one embodiment, the coefficient of energy absorption of the shock absorbing assemblies are adjustable in a conventional manner. For example, the coefficient of energy absorption may be increased when the locomotive is traveling faster and/or decreased when the locomotive is traveling slower or when impact with a pedestrian is more likely. Although the illustrated shock absorbing assemblies are double acting cylinders, one should appreciate that other configurations may be utilized. For example, sets of single acting hydraulic cylinders may be utilized in place of each double acting cylinder in accordance with the present invention. One will also appreciate that the size and configuration of the shock absorbing assemblies may also be selected to absorb the impact of a pedestrian instead of, or in addition to, absorb the impact of a vehicle. The configurations and geometries shown are equally applicable to a collision attenuator intended for pedestrians and/or vehicles. In the case of pedestrian impacts, smaller force shock absorbers are used and a lighter weight contact plate is preferably used.

Preferably, the shock absorbing assemblies are pneumatic or hydraulic shock absorbing assemblies, however, one will appreciate that other types of mechanical and electromechanical working cylinders and/or other energy absorbing means may be utilized in accordance with the present invention.

Contact plate 39 is secured to the forward end of locomotive 31 via each shock absorbing assemblies 38. One should appreciate that a wide variety of configurations may be used to mount contact plate 39 to the front of locomotive 31. For example, a single, centrally located cylinder could be used to mount plate 39 to the front of locomotive 31. Alternatively, a row of three, four, five or more cylinders could be used to mount plate 39 to the front of locomotive 31. Further still, multiple rows of shock absorbing assemblies could be used in accordance with the present invention.

In one embodiment, contact plate 39 includes a reinforced rubber sheet 46, which is dimensioned such that it extends from a lower edge 47 adjacent railway rail 35 to an upper edge 48 above coupler 34, and such that it extends substantially the width of locomotive 31. Contact plate 39 is provided with a coupler door 49 which allows the contact plate to retract rearwardly of the leading edge of coupler 34. Preferably, the clearance between lower edge 47 and railway rail 35 is less than two feet, preferably within the range of approximately 2 to 12 inches, and most preferably within the range of approximately 4 to 6 inches.

In the illustrated embodiment, contact plate 39 is at least approximately one-half inch thick, and is constructed from a material that has sufficient structural integrity to withstand the force of impact with a moving vehicle but is somewhat flexible and/or stretchable in order to provide some give during impact, as is described in greater detail below. Suitable materials for contact plate 39 include, but are not limited to rubbers, plastics, metals, alloys, composites and other natural or synthetic materials. Optionally, the contact plate can be in the form of a mesh or woven structure. A layer of foam or other soft material can be affixed to the face of the contact plate to reduce injuries to pedestrians.

As shown in FIG. 1, collision attenuator 30 includes a control switch 51 which allows a train operator to move the collision attenuator between its deployed and retracted modes, that is, move contact plate 39 between its deployed and retraced positions. By actuating control switch 51, the train operator may extend piston rods 42 from cylindrical housings 43 in order to deploy contact plate 39 forwardly of coupler 34. In the event that the railway locomotive 31 strikes a motor vehicle such as an automobile on or crossing railway 35 when contact plate 39 is in the deployed position, the vehicle would impact against contact plate 39 which, in turn, imparts the force of impact on piston rods 42. Piston rods 42 are thus depressed into cylindrical housing 43 wherein the collision shock is absorbed by shock absorbing assembly 38 thereby reducing the impact forces on the impacted vehicle.

Figure 2:
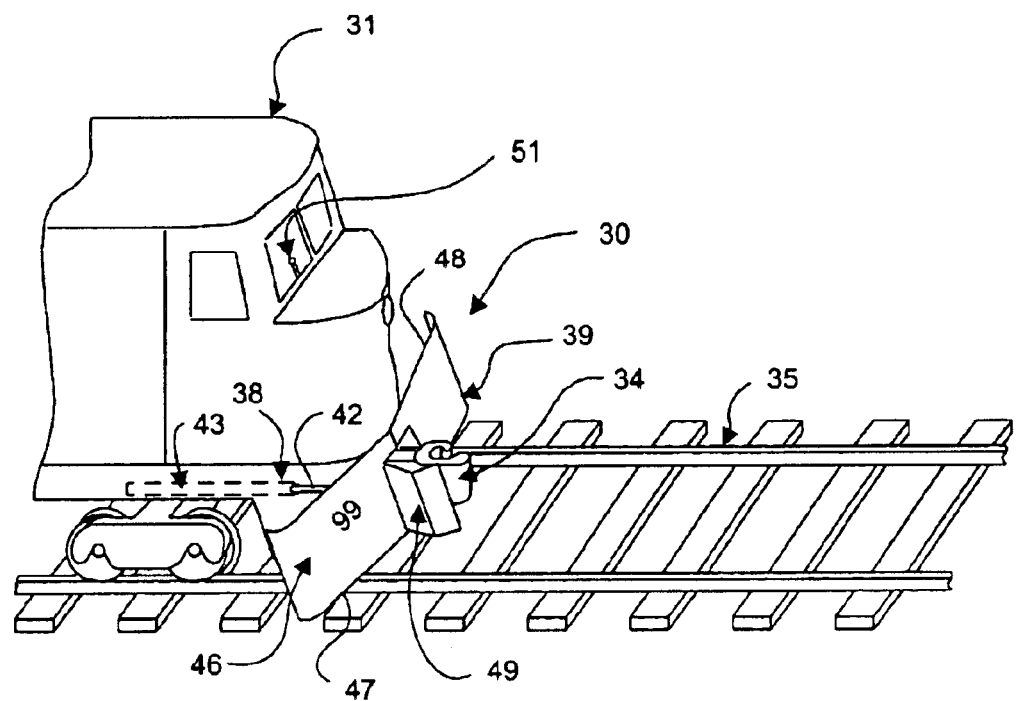
FIG. 2 is a perspective view of the collision attenuating system of FIG. 1, the attenuating system shown in a retracted mode.

FIG. 2 shows collision attenuator 30 of FIG. 1 with contact plate 39 in the retracted position. The train operator has used control switch 51 to retract shock absorbing assemblies 38 such that each piston rod 42 is now retracted into its respective cylindrical housing 43. At this time the collision attenuator is clear of coupler 34 allowing the coupler to be used to attach locomotive 31 to another railway car. The retracted position or mode of collision attenuator 30 is the normal stowed position of the attenuator when the locomotive, or other rail car to which the collision attenuator is mounted, is not the leading car, or engine in the train.

Figure 3:
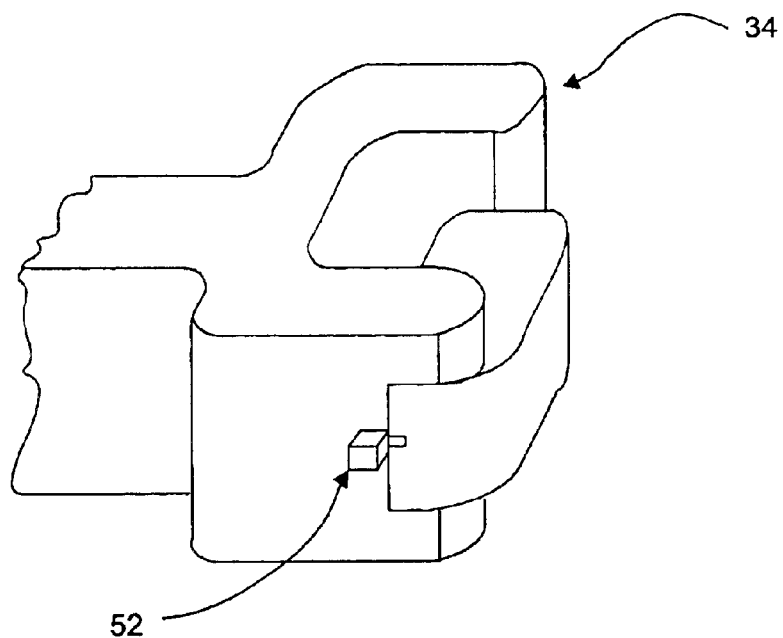
FIG. 3 is an enlarged perspective view of a coupler detector sensor of the collision attenuating system of FIG. 1, the coupler detector sensor mounted on a coupler of the locomotive.

In one embodiment, the collision attenuating system is provided with a coupler detector sensor 52 in order to determine the operating state of coupler 34, that is whether the coupler is opened or closed. Preferably, coupler detector sensor 52 is a micro-switch that is mounted on coupler 34 as shown in FIG. 3. One will appreciate that other suitable means can be utilized in order to determine the operating state of the coupler. For example, coupler detector sensor 52 may include solenoid switches, rheostats, magnetic switches, and/or other suitable means in accordance with the present invention. In the illustrated embodiment, coupler detector sensor 52 is mounted on coupler 34 such that whenever the coupler is open, the micro-switch is closed, however, the actual configuration may vary depending upon the control system of the collision attenuating system.

Figure 4:
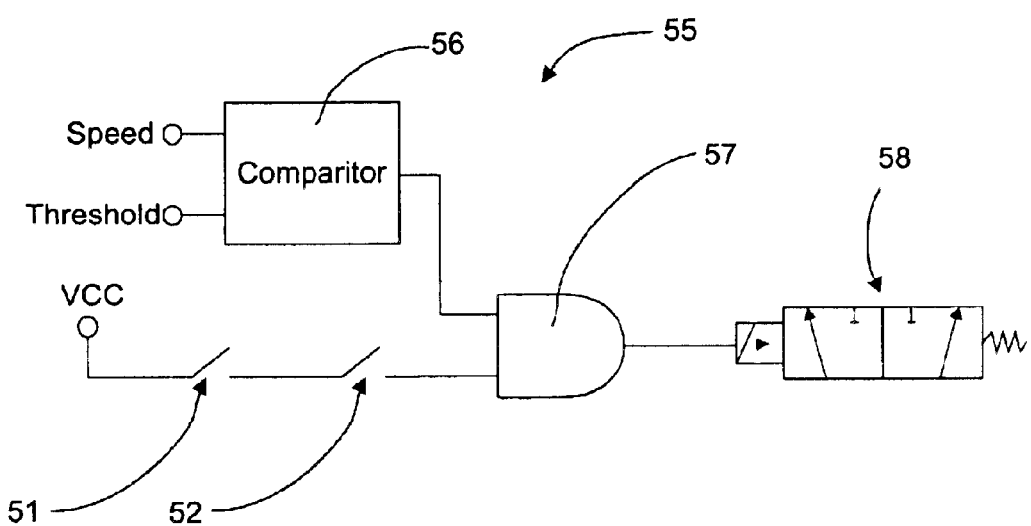
FIG. 4 is a schematic view of a control system for controlling an absorber extension control circuit of the collision attenuating system of FIG. 1.

FIG. 4 shows an exemplary control system 55 for controlling collision attenuating system 30, namely, for controlling a solenoid valve operably connected with hydraulic or pneumatic shock absorbing assembly 38 which, in turn, controls the position of contact plate 39. As noted above, control switch 51 is located in the cab of locomotive 31 and is preferably closed when the operator flips the control switch to its extend or deployed position. Coupler detector sensor 52 is located on coupler 34 and is preferably closed when the coupler is in the open position thus indicating that locomotive is not joined to another rail car and is instead leading the train. FIG. 4 illustrates an open circuit in which both control switch 51 and coupler detector sensor 52 are open thus preventing activation of the collision attenuating system and thus preventing movement of contact plate 39 to its deployed position. One will appreciate, however, that the open state of either the control switch or the coupler detector sensor will prevent activation of the collision attenuating system.

Preferably, control system 55 is configured to prevent activation of the collision attenuating system unless locomotive 31 is moving faster than a predetermined minimum speed. Control system 55 includes a comparator 56 that compares a speed signal, which is indicative of the speed at which locomotive 31 is moving, to a specified minimum speed threshold. Comparator 56 outputs a true value to a gate 57 when the locomotive speed is above the minimum threshold speed, for example, when the locomotive is traveling above 10 mph. When both control switch 51 and coupler detector sensor 52 are closed and comparator 56 determines that the speed is above the threshold, gate 57 is active and in turn activates solenoid valve 58 thereby enabling solenoid valve 58 to adjust shock absorbing assembly 38 and move contact plate 39 to its deployed position. Alternatively, the control system may be configured to adjust the coefficient of energy absorption such that the coefficient is increased when the locomotive is traveling faster and/or decreased when the locomotive is traveling slower.

One will appreciate that the control system can be configured to adjust the amount of shock absorption based upon the speed of the locomotive. For example, the solenoid valve may be a variable throttle type valve which may be adjusted in response to the speed at which the locomotive is traveling.

Figure 5:
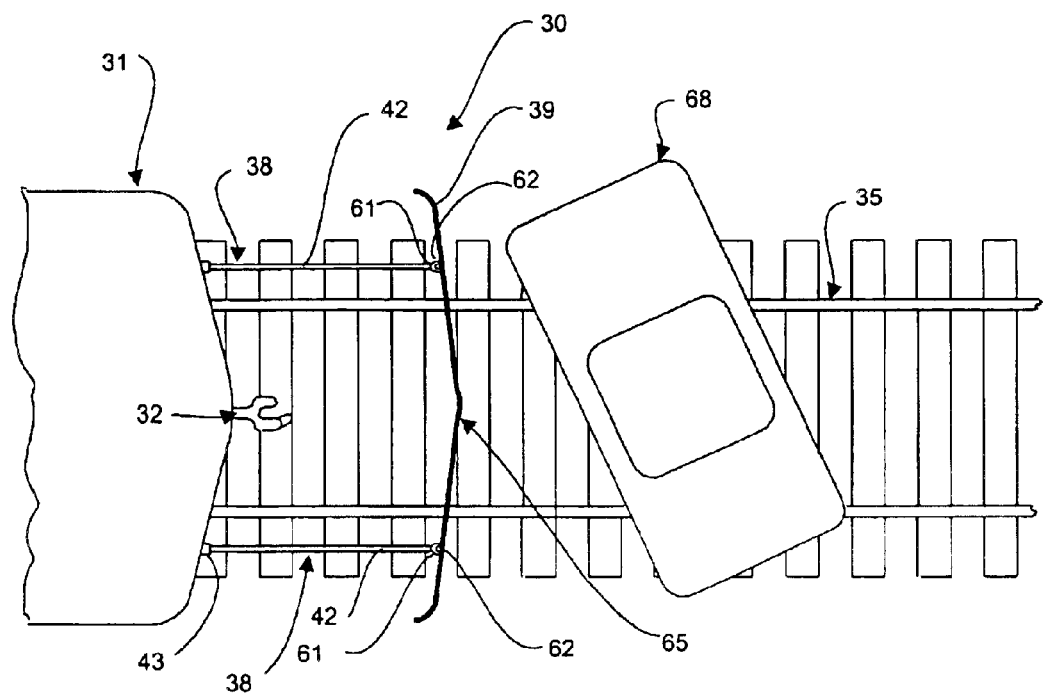
FIG. 5 is a plan view of the collision attenuating system of FIG. 1, the attenuating system shown in the extended, deployed mode prior to impact with a moving vehicle in the path of the locomotive.

Turning now to FIG. 5, contact plate 39 is pivotally connected to the forward end of each piston rod 42 by a pivotable connection 61. In the illustrated embodiment, pivotable connection 61 includes a substantially vertically oriented connection pin 62 that allows the contact plate 39 to pivot horizontally with respect to piston rods 42. One should appreciate that other types of pivotal connections may be used including, but not limited to, ball joints.

Preferably, contact plate 39 has an expandable center portion 65 that can lengthen as contact plate 39 pivots with respect to shock absorbing assemblies 38. In the illustrated embodiment, contact plate 39 has an obtuse angled center portion 65 which will flatten and laterally expand upon impact as the angled portion flattens, partially or completely. One should appreciate that other suitable means may be utilized to provide an expandable center portion in accordance with the present invention. For example, the material of the contact plate may be formed of a stretchable material including, but not limited to, rubber and plastic, which will stretchably give thereby allowing the shock absorbing assemblies to retract in varying amounts. Alternatively, the expandable center portion can be formed of several rigid or semi rigid portions that telescope with respect to one another. For example, the contact plate may include a central portion having a set of small tubes telescopically received in slightly larger tubes of respective outer portions.

Figure 6:
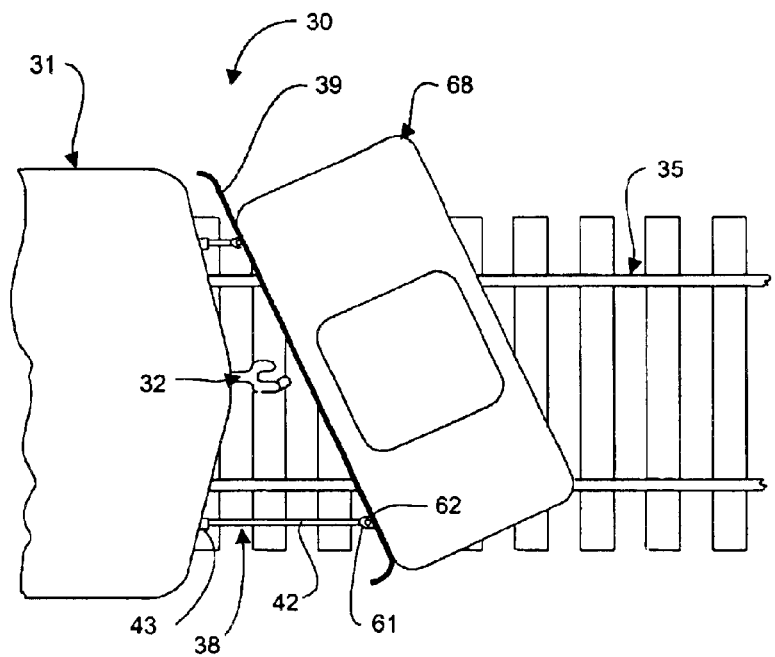
FIG. 6 is a plan view of the collision attenuating system of FIG. 1, the attenuating system shown in a partially retracted mode after impacting the moving vehicle of FIG. 5.

With continued reference to FIG. 5, locomotive 31 is traveling forward with the contact plate 39 in the deployed position. Locomotive 31 is shown approaching a vehicle 68 that is on or crossing railway 35 at an angle. Turning now to FIG. 6, upon impact, vehicle 68 and contact plate 39 are forced rearward with respect to the locomotive. As shown in FIG. 6, the left or upper portion of contact plate 39 contacted vehicle 68 first causing the left or upper shock absorbing assembly to compress further than the right or lower shock absorbing assembly. Accordingly, contact plate 39 has pivoted about pivotable connections 61 as the contact plate aligned with the side of vehicle 68. This pivotable configuration distributes the force more uniformly across the side of vehicle 68 and thus decreases the severity of damage to the vehicle. Expandable center portion 65 laterally expands as necessary to geometrically accommodate varying degrees of retraction of shock absorbing assemblies 38 and thus reduces the lateral or side loading forces upon the shock absorbing assemblies.

Figure 7:
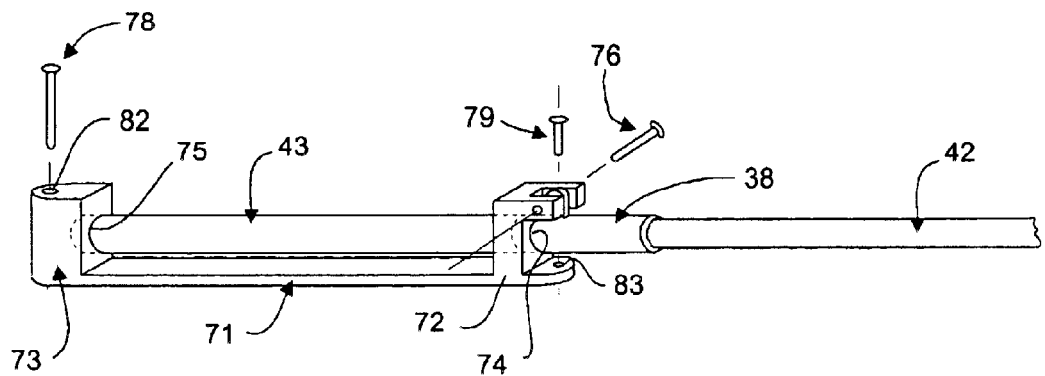
FIG. 7 is a detailed perspective view of a mounting frame for the collision attenuating system of FIG. 1, the mounting frame including a quick-release configuration.

Turning now to FIG. 7, collision attenuating system 30 preferably includes a quick-release mounting frame 71 for removably mounting each shock absorbing assembly 38 to the front end of the locomotive or other relatively large vehicle. In the illustrated embodiment, quick-release mounting frame 71 includes a forward bracket 72 and a rearward bracket 73. One end of shock absorbing assembly 38 is configured to slide through a through-hole 74 in forward bracket 72 and into a recess 75 of rearward bracket 73.

Once in place, shock absorbing assembly 38 is secured to mounting frame 71 with a removable securing pin 76. Accordingly, shock absorbing assembly 38 and the remaining portions of the collision attenuator can be quickly and easily removed from the mounting frame, as well as from the locomotive, by releasing securing pin 76 and pulling the shock absorbing assembly out of the brackets. This configuration makes it possible to quickly replace a damaged collision attenuator. Securing pin 76 can be in the form of a well-known removable fastener such as spring loaded pin that can be pulled and turned to release, and simply turned to reengage. Alternatively, any quick-release latch can be used in place of or in addition to the securing pin. One will also appreciate that other bracket geometries and other suitable means may be utilized to removably secure the shock absorbing assembly to the mounting frame.

A pivot pin 78 releasably slides through a substantially vertically oriented pivot bore 82 in rearward bracket 73 and the corresponding bores of a pivot flange mounted on the locomotive in order to pivotally secure the rear end of mounting frame 71 to the locomotive. A locking pin 79 slides though a locking bore 83 in forward bracket 72 and a corresponding bore of a locking flange mounted on the locomotive to releasably secure the forward end of mounting frame 71 to the locomotive. One will appreciate that, when both pivot pin 78 and locking pin 79 are used, mounting frame 71 and shock absorbing assembly 38 cannot move with respect to the locomotive, however, when only pivot pin 78 is used, the mounting frame and the shock absorbing assembly are free to pivot about the longitudinal axis of pivot pin 78.

Figure 8:
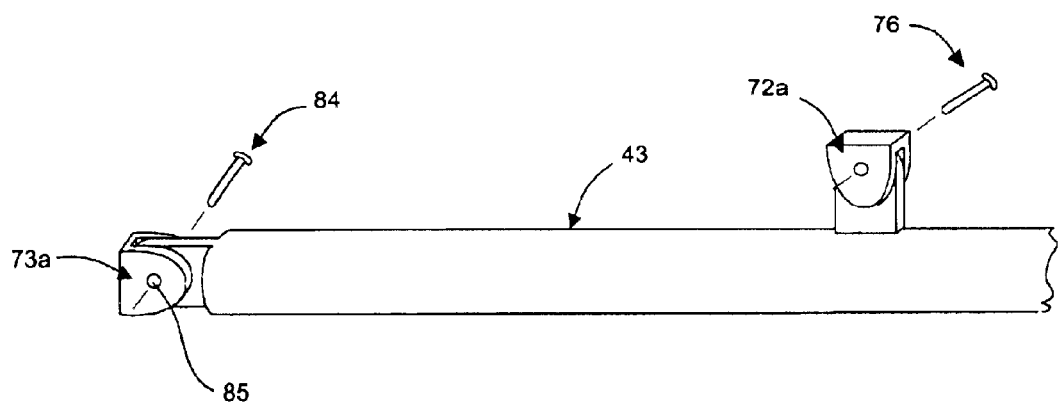
FIG. 8 is a detailed view of another mounting assembly for the collision attenuating system of FIG. 1, the mounting frame including a quick-release configuration.

One will appreciate that other means can be utilized to releasably and/or pivotally secure the shock absorbing assemblies to the locomotive or other relatively large vehicle. For example, another quick-release mounting assembly is shown in FIG. 8. In this embodiment, cylindrical housing 43 is releasably secured to forward mounting bracket 72a and rearward mounting bracket 73a in a manner similar to that described above. Both the forward and rearward brackets may be permanently mounted on the locomotive or other large vehicle. Cylindrical housing 43 is releasably and pivotally secured to rearward bracket 73*a* by a transverse pivot pin 84 extending through a transverse pivot bore 85 of the rearward bracket. The transverse pivot configuration of rearward bracket 73*a* allows cylindrical assembly 43 to pivot up and down about pivot pin 84. Securing pin 76 may be utilized to prevent pivoting action of cylindrical assembly 43 or to otherwise secure the cylindrical assembly to forward bracket 72*a* and, in turn, the locomotive.

Figure 9:
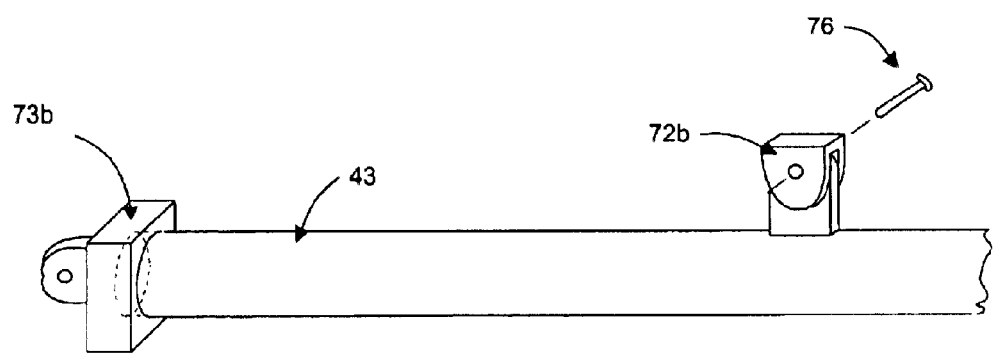
FIG. 9 is a detailed view of another mounting assembly for the collision attenuating system of FIG. 1, the mounting frame including a quick-release configuration.

FIG. 9 discloses another quick-release configuration in which forward and rearward mounting brackets 72*b* and 73*b*, respectively, may be permanently affixed to the locomotive or other large vehicle but do not allow pivoting action of cylindrical housing 43. In this regard, rearward bracket 73*b* includes a longitudinally extending bore dimensioned and configured to receive the rearward end of cylindrical housing 43. Once cylindrical housing 43 is inserted into rearward bracket 73*b*, securing pin 76 may be used to releasably secure the cylindrical housing to the locomotive or other large vehicle.

Figure 10:
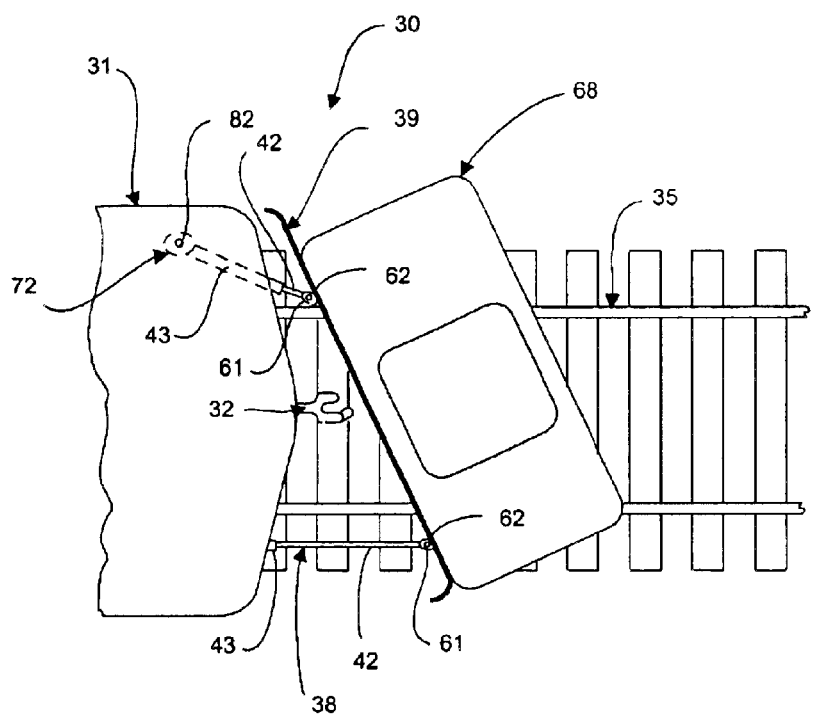
FIG. 10 is a plan view of the collision attenuating system of FIG. 1 showing lateral pivoting allowed by the mounting frame of FIG. 7.

FIG. 10 shows collision attenuating system 30 configured such that the left or upper with shock absorbing assembly 38 is mounted using only the pivot pin thus allowing pivotal motion about the axis of pivot bore 82. In contrast, the right or lower shock absorbing assembly 38 is mounted using both the pivot pin and the locking pin thus preventing pivotal motion. In this configuration, when contact plate 39 contacts vehicle 68 at an angle with respect to railway 35, the upper shock absorbing assembly 38 collapses first and pivots around pivot pin 78 allowing contact plate 39 to align with the side of vehicle 68. When this configuration is used, an expandable center portion of the contact plate may be used but is not necessary.

Figure 11:
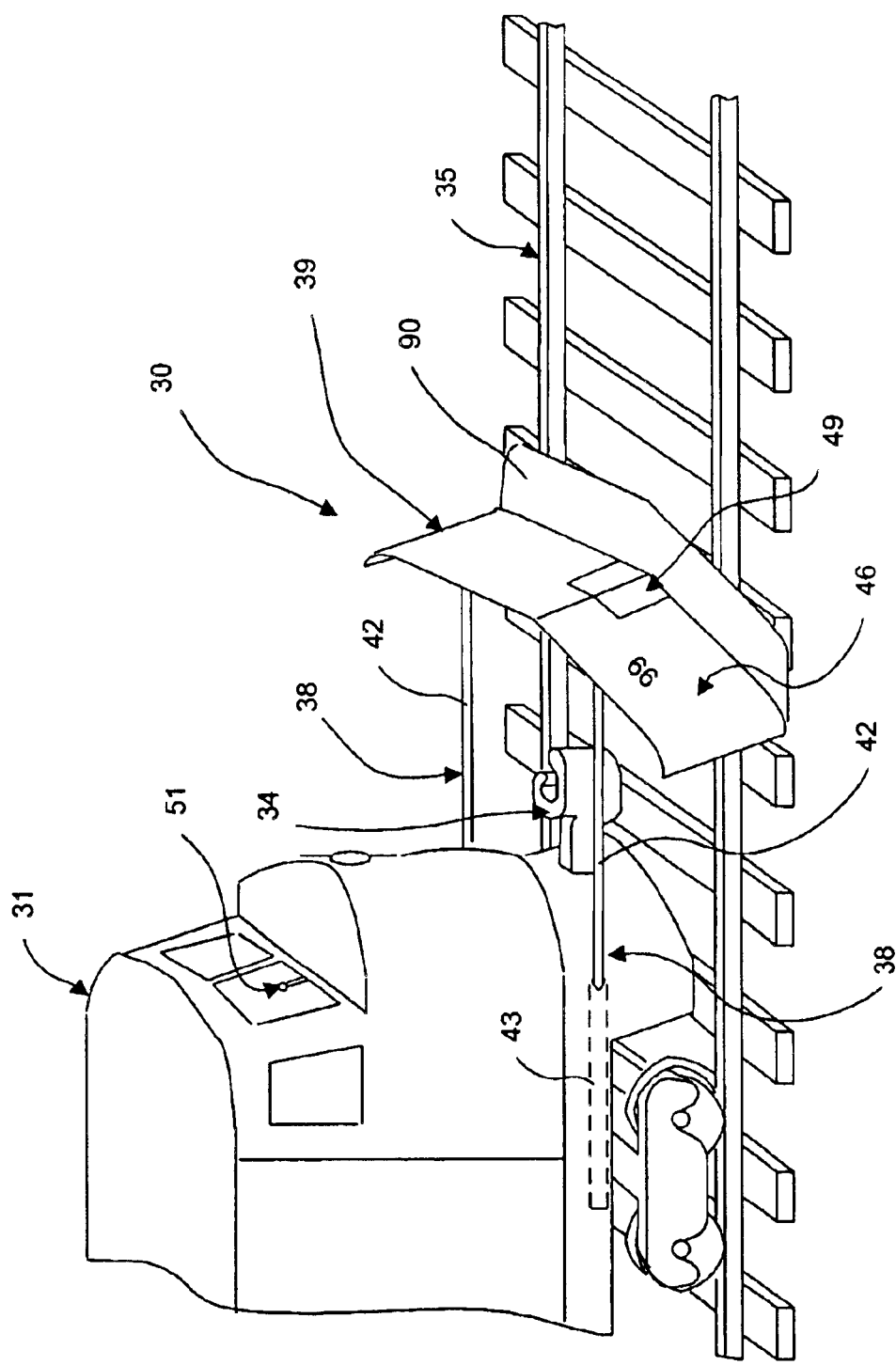
FIG. 11 is a perspective view of the collision attenuating system of FIG. 1 equipped with a vehicle capture structure.

FIG. 11 shows collision attenuator 30 equipped with an optional vehicle capture structure 90 extending along lower edge 47 of contact plate 39. Capture structure 90 is made of rigid or semi-rigid material and extends forwardly from the lower edge of the contact plate such that it will extend under an impacted vehicle. After impact with a vehicle, capture structure 90 supports the vehicle and prevents the vehicle form rolling under the still moving train. Capture structure 90 can be affixed directly to contact plate 39, as is illustrated in FIG. 11. Alternatively, the capture structure may be affixed via support braces to the contact plate, the shock absorbing assemblies and/or the locomotive. In the event that the capture structure is attached directly to the locomotive, the capture structure will remain in place as the contact plate retracts during a collision. In such a case, more of the capture structure will remain under the impacted vehicle, better preventing vehicle roll under. One should appreciate that the capture structure described above may be utilized on any of the illustrated embodiments in accordance with the present invention.

Figure 12:
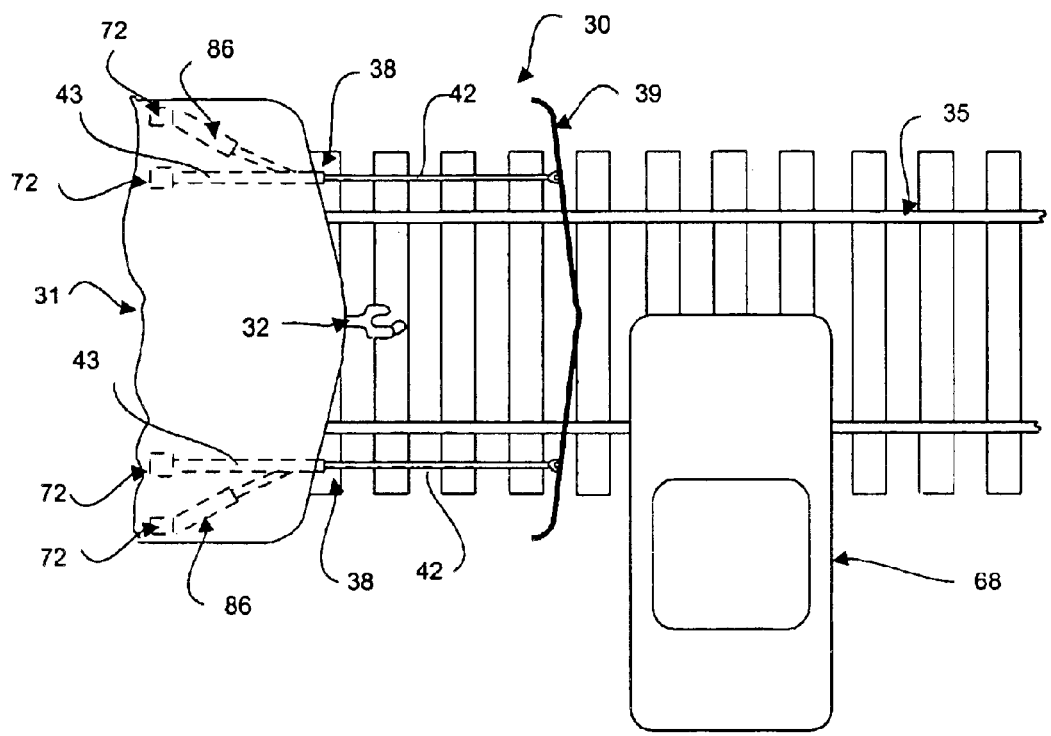
FIG. 12 is a plan view of another collision attenuating system in accordance with the present invention, similar to that shown in FIG. 1, the attenuating system shown in an extended, deployed mode prior to impact with a moving vehicle.
Figure 13:
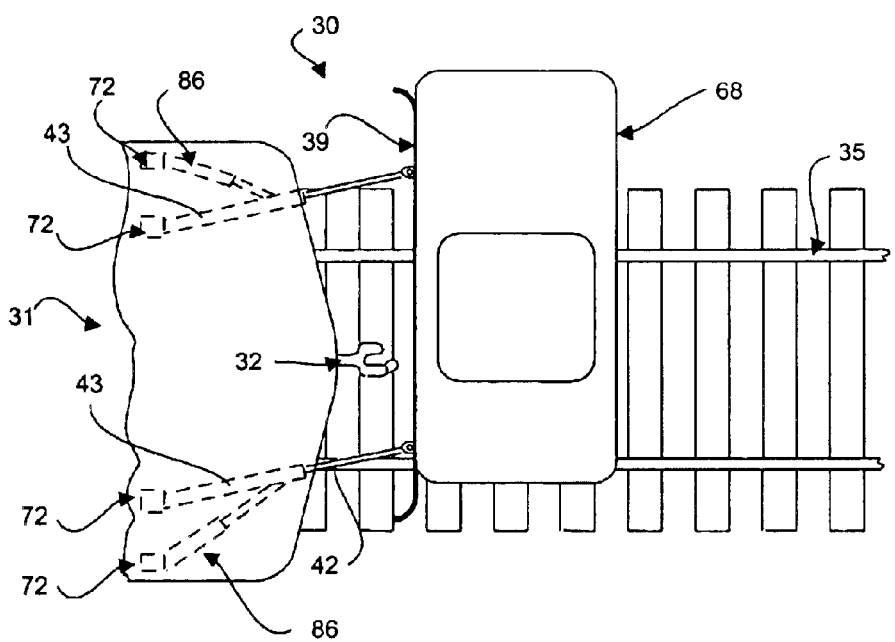
FIG. 13 is a plan view of the collision attenuating system of FIG. 12 shown in the retracted mode after impacting the moving vehicle.

Turning now to FIG. 12 and FIG. 13, collision attenuating system 30 is provided with supplemental shock absorbing assemblies in the form of diagonally oriented lateral energy absorbing units 86. Lateral units 86 are configured to interconnect a portion of shock absorbing assembly 38 to locomotive 31 such that a lateral component of the impact force can be absorbed. In the illustrated embodiment, lateral units 86 are similar to the shock absorbing assemblies and may be provided in the form of a pneumatic cylinder, a hydraulic cylinder, or other suitable energy absorbing means.

FIG. 12 and FIG. 13 respectively illustrate collision attenuating system 30 equipped with lateral units 86 just prior to and after impacting moving vehicle 68. On impact, the forward motion of vehicle 68 applies an impact force at an angle relative to contact plate 39. After contacting the vehicle, shock absorbing assembly 38 will compress absorbing the longitudinal component of the impact energy. Shock absorbing assembly 38 will also rotate horizontally as lateral units 86 extend or compress thus absorbing the side load energy, that is, the lateral component of the force of impact. This lateral unit configuration is especially useful when, for example, the locomotive impacts a vehicle that is crossing a set of railroad tracks at a significant speed.

FIG. 14 shows the general configuration of contact plate 39, shock absorbing assemblies 38 and lateral load units 86. In this configuration, the ends of lateral load units 86 and shock absorbing assemblies 38 are releasably and directly mounted on locomotive 31 with horizontally pivoting lateral mounts 87 and cylindrical housing mounts 88, respectively. One will appreciate that the cylindrical housing mounts and/or the lateral mounts may be in the form of the rearward bracket/pivot pin configuration described above (i.e., reward bracket 73 and pivot pin 78), in the form of a horizontally oriented cylindrical housing mounting bracket 93 that are similar to vertically oriented rearward mounting bracket 73*a*, and/or in the form of other suitable configurations which allow a pivoting action about an upright axis. When contact plate 39 contacts a vehicle that is moving across the railway, lateral load units 86 either lengthen or shorten in the manner illustrated in FIG. 13 thus absorbing the side load or lateral component of the impact force.

As shown in FIG. 15, each cylindrical housing mount 88 is releasably secured, via a universal pivot bracket 89, to a cylindrical housing bracket 93 that is mounted on the locomotive. Each cylindrical housing mount is secured with a spring loaded pin 94, which pin can be pulled and turned to release, and simply turned to reengage. Similarly, lateral energy absorbing units 86 are releasably secured to similar brackets mounted on the locomotive. In the illustrated embodiment, the lateral brackets are located outboard of and substantially at the same height as cylindrical housing mounts 88 such that lateral energy absorbing units 86 absorb a lateral component of the impact forces in the manner illustrated in FIG. 13. One should appreciate, however, that the lateral mounts need not be arranged at the same height as that of the cylinder mounts and may instead be arranged at a different height in order to absorb a vertical component of the impact force addition to the lateral component.

Figure 16:
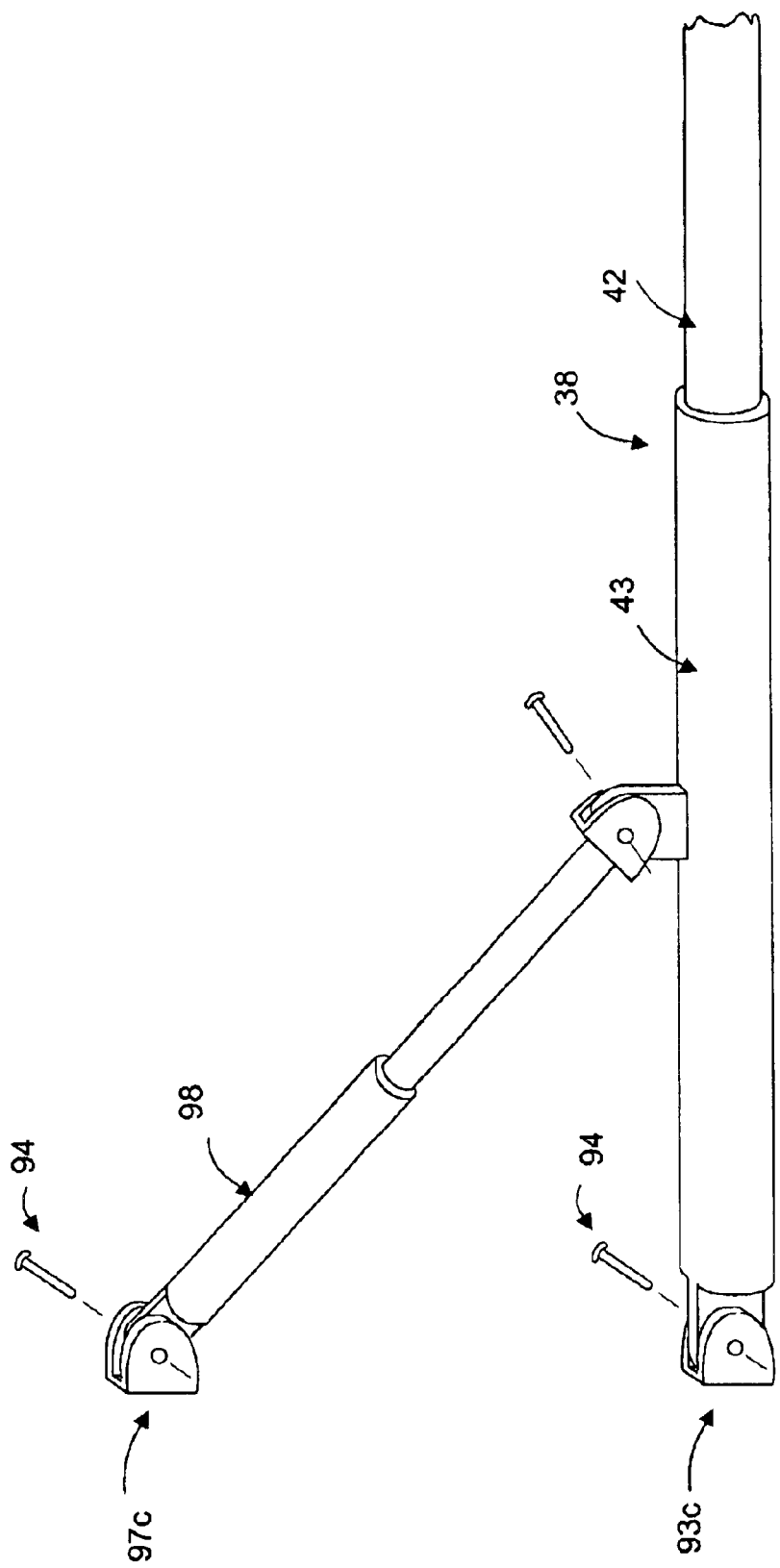
FIG. 16 is a detailed elevational view, similar to FIG. 15, of a modified mounting assembly of a collision attenuating system in accordance with the present invention.

In the embodiment of FIG. 14 and FIG. 15, the collision attenuating system 30 is also provided with a pair of lifting cylinders 96 that are used to pivot shock absorbing assemblies 38 about the lower universal pivots 89 in order to raise and lower shock absorbing assemblies 38. Lifting cylinders 96 are releasably secured to the locomotive, via lifting cylinder brackets 97, in the same manner as the cylindrical housings and the lateral units described above. Lifting cylinders 96 may be retracted to pivot shock absorbing assembly 38 about the lower universal pivots 89 such that contact plate 39 is raised above coupler 34 before the contact plate is retracted to a stowed position. In such an embodiment, one will appreciate that the contact plate need not be provided with a coupler door. Alternatively, one should appreciate that a rigid brace 98 may be used in place of lifting cylinder 96 as shown in FIG. 16. In this embodiment, the contact plate is provided with a coupler door as the contact plate cannot be raised in this configuration. In this embodiment, brace 98 is attached directly to bracket 97*c* with a spring loaded pin 94.

Figure 17:
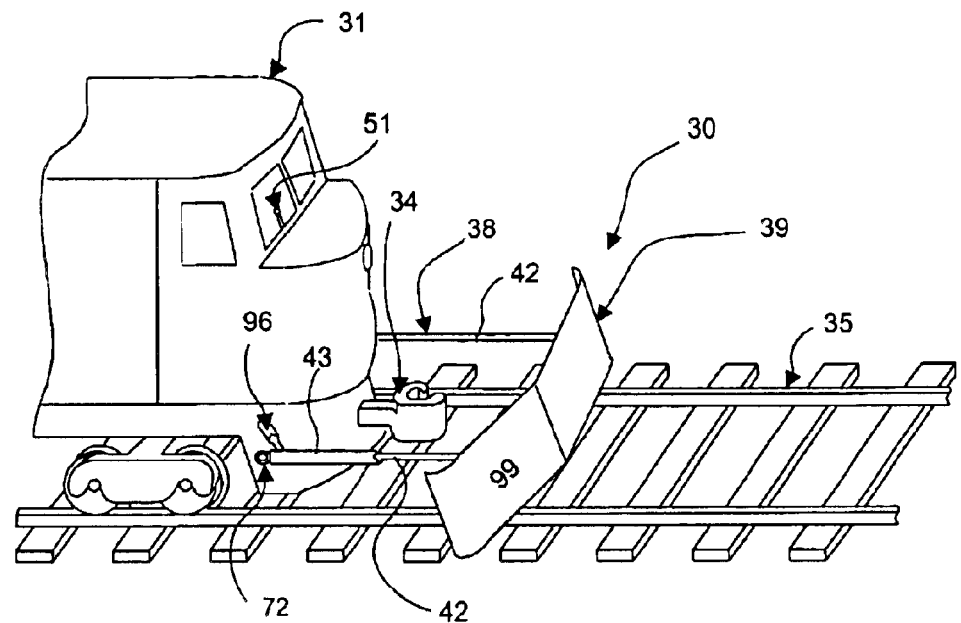
FIG. 17 is a perspective view, similar to FIG. 1, of another collision attenuating system in accordance with the present invention the attenuating system shown in an extended, deployed mode prior to impact with a moving vehicle.
Figure 18:
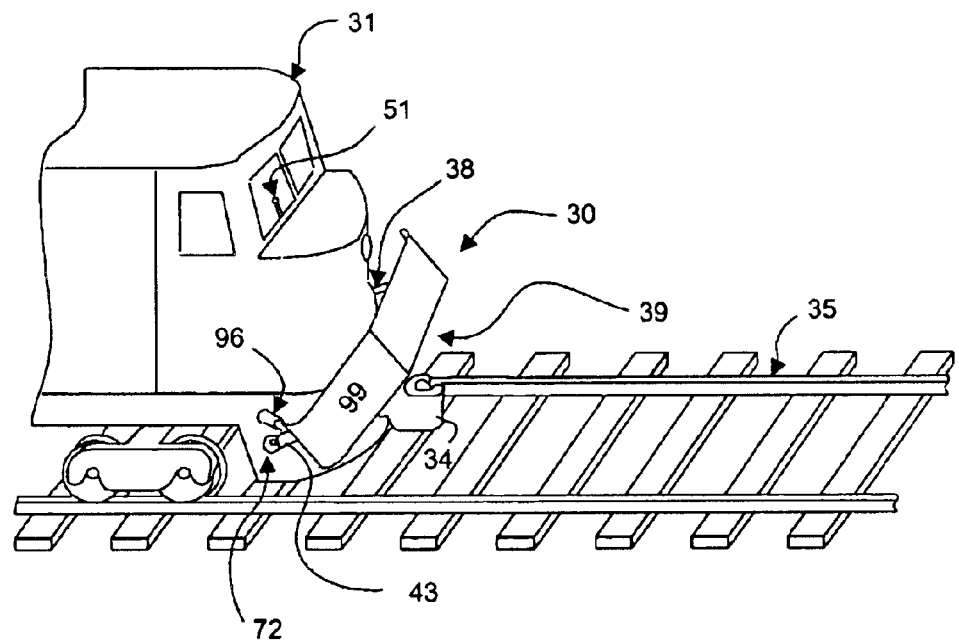
FIG. 18 is a perspective view of the collision attenuating system of FIG. 17 shown in a stowed mode clear of the coupler.

FIG. 17 and FIG. 18 illustrate a collision attenuating system that is provided with lifting cylinder 96 in which the lifting cylinder has positioned the shock absorbing assembly 38 in a deployed position and in a stowed position, respectively. In the deployed position shown in FIG. 17, contact plate 39 of collision attenuating system 30 is lowered and extended in front of coupler 34. Shock absorbing cylinders 38 are in the extended position and are ready to absorb the energy of a collision. In the retracted position shown in FIG. 18, contact plate 39 is positioned above and behind coupler 34. The retracted position allows coupler 34 to be used to attach locomotive 31 to another locomotive or railcar.

In any of the above embodiments, the forward surface of contact plate 39 may be provided with a slippery coating 99 which will reduce the lateral component of impact force as the slippery coating will allow the impacted vehicle to slide along the forward surface of the contact plate. For example, the slippery coating may be in the form of a synthetic material including, but not limited to, TEFLON® and other suitable materials providing a low coefficient of friction. Alternatively, the front face of the contact plate may be highly polished or otherwise treated to provide a slick surface. Such a slippery configuration will minimize lateral deceleration of the impacted vehicle thus promoting the impacted vehicle to slide across the contact plate and around the side of locomotive. One will appreciate that such a slippery configuration will also minimize the possibility of the impacted vehicle being crushed underneath the locomotive.

Figure 19:
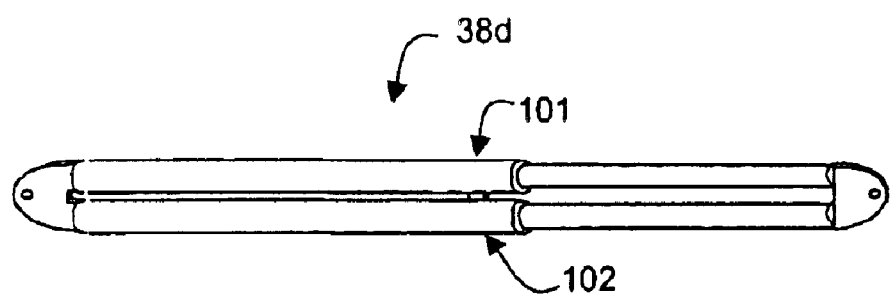
FIG. 19 is a detailed perspective view of another a modified shock absorbing assembly for use with the collision attenuating systems of the present invention.

It should be noted that, the shock absorbing cylinders are preferably double acting hydraulic or pneumatic cylinders that operate as shock absorbing cylinders when in the extended position. In any of the above embodiments, the shock absorbing assembly may instead utilize a dual-actuating pneumatic cylinder in combination with a hydraulic shock absorber. For example, as shown in FIG. 19, shock absorbing assembly 38d includes a dual-actuating pneumatic cylinder assembly 101 configured for adjusting the position the contact plate with respect to the coupler and the locomotive. Shock absorbing assembly 38d also includes a hydraulic shock absorber 102 for absorbing the energy of impact. Alternatively, the shock absorbing cylinder may utilize a pair of single acting hydraulic or pneumatic cylinders, one configured to absorb energy in a first compression direction and the other for absorbing energy in a second extension direction, and/or other suitable arrangements.

For convenience in explanation and accurate definition in the appended claims, the terms "up" or "upper", "down" or "lower", "forward" and "rearward" are used to describe features of the present invention with reference to the positions of such features as displayed in the figures.

While the collision attenuator of the present invention has been described in combination with a locomotive, it is understood that the collision attenuator of the present invention may be used with other vehicles including, but not limited to, sport-utility vehicles, vans, trucks, and buses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A collision attenuator for vehicle having a coupler, said attenuator comprising:
   an energy absorbing cylinder;
   a mounting assembly adapted to secure said energy absorbing cylinder to an end of the vehicle;
   a contact plate mounted to said energy absorbing cylinder;
   a control valve for extending and retracting said energy absorbing cylinder in order to move said contact plate with respect to the end of the vehicle; and
   a coupler detector operable coupled with said control valve, wherein said coupler detector inhibits the extension of said energy absorbing cylinder unless the coupler detector determines that the coupler is open.

2. The collision attenuator of claim 1, wherein said mounting assembly is adapted to pivotally secure said energy absorbing cylinder to the end of the vehicle, and wherein said contact plate is longitudinally extendable and laterally displaceable with respect to the end of the vehicle, said collision attenuator further compromising a comparator operably coupled with said control valve, wherein said comparator is configured to control said energy absorbing cylinder based upon a speed signal indicative of the speed of the moving vehicle.

3. The collision attenuator a claim 2, wherein a coefficient of energy absorption of said energy absorbing cylinder is adjustable and said comparator is configured to adjust the coefficient of energy absorption.

4. The collision attenuator of claim 2, said collision attenuator further comprising a minimum speed detector, wherein said comparator inhibits the extension of said energy absorbing cylinder until the vehicle reaches minimum threshold speed.

5. The collision attenuator a claim 2, wherein said energy absorbing cylinder is either a double acting hydraulic cylinder or a double acting pneumatic cylinder.

6. The collision attenuator of claim 2, wherein said mounting assembly comprises a quick-release mechanism for detachable securing said energy absorbing assembly to the end of the vehicle.

7. The collision attenuator of claim 1, wherein said energy absorbing cylinder is either a double acting hydraulic cylinder or a double acting pneumatic cylinder.

8. The collision attenuator of claim 1, said collision attenuator further comprising a comparator operably coupled with said control valve, wherein said comparator is configured to adjust said energy absorbing cylinder based upon a speed signal indicative of the speed of the moving vehicle.

9. The collision attenuator of claim 1, wherein said mounting assembly is adapted to pivotally secure said energy absorbing cylinder to the end of the vehicle, said collision attenuator further comprising a pivot assembly pivotally securing said contact plate to said energy absorbing cylinder allowing said contact plate to pivot laterally about an upright axis with respect to said energy absorbing cylinder, wherein contact plate is longitudinally extendable and laterally displaceable with respect to the end of the vehicle.

10. The collision attenuator according to claim 9, said collision attenuator further comprising a diagonally oriented lateral energy absorbing unit configured to interconnect a portion of said energy absorbing cylinder to the vehicle.

11. The collision attenuator according to claim 9, wherein said contact plate pivots with respect to said energy absorbing cylinder about a vertical axis.

12. The collision attenuator of claim 9, wherein said mounting assembly comprises a quick-release mechanism for detachably securing said energy absorbing assembly to the end of the vehicle.

13. The collision attenuator a claim 9, wherein said contact plate comprises a laterally expandable section.

14. A collision attenuator for a vehicle, said attenuator comprising:
   an energy absorbing cylinder;
   a mounting assembly adapted to secure said energy absorbing cylinder to an end of the vehicle;
   a contact plate mounted to said energy absorbing cylinder;
   a control valve for extending and retracting said energy absorbing cylinder in order to move said contact plate with respect to the end of the vehicle; and
   wherein said contact plate includes a laterally expandable section that is located intermediate opposing lateral ends of said contact plate and is configured to laterally expand upon impact.

15. Th collision attenuator of claim 14, wherein said laterally expandable section includes an obtuse angled portion that is configured to at least partially flatten upon impact to cause lateral expansion of said contact plate.

16. The collision attenuator of claim 14, further comprising a plurality of energy absorbing cylinders, said contact plate mounted to an outer end of each one of said energy absorbing cylinders.

17. The collision attenuator of claim 16, further comprising a plurality of mounting assemblies adapted to secure said plurality of energy absorbing cylinders to the end of the vehicle, wherein at least of said one mounting assemblies includes a horizontal pivot allowing said one mounting assembly and a corresponding energy absorbing cylinder to pivot with respect to the end of the vehicle.

18. The collision attenuator of claim 14, wherein said contact plate comprises a vehicle support portion extending along and forward from a bottom edge of said contact plate.

19. The collision attenuator of claim 18, said collision attenuator further comprising a comparator operably couple with said control valve, wherein said comparator is configured to adjust said energy absorbing cylinder based upon a speed signal indicative of the speed of the moving vehicle.

20. The collision attenuator of claim 19, said collision attenuator further comprising a pivot assembly pivotally securing said contact plate to said energy absorbing cylinder allowing said contact plate to pivot laterally about an upright axis with respect to said energy absorbing cylinder.

21. The collision attenuator of claim 14, further comprising a pair of energy absorbing cylinders, said contact plate mounted to an outer end of each one of said energy absorbing cylinders such that said laterally expandable section is located between said pair of energy absorbing cylinders.

22. The collision attenuator of claim 15, further comprising a pair of energy absorbing cylinders said contact plate mounted to an outer end of each one of said energy absorbing cylinders such that said obtuse angled portion is located between said pair of energy absorbing cylinders.

* * * * *